United States Patent
Minakawa et al.

(10) Patent No.: US 6,820,266 B1
(45) Date of Patent: Nov. 16, 2004

(54) APPLICATION CODE CONVERSION ARCHITECTURE

(75) Inventors: Garret Minakawa, San Jose, CA (US); David Wrightson, Tracy, CA (US); Bonnie Shebat Williams, Los Gatos, CA (US); Janet Hong Lee, Union City, CA (US); Vicente Lang, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 493 days.

(21) Appl. No.: 09/775,886

(22) Filed: Feb. 2, 2001

Related U.S. Application Data

(63) Continuation of application No. 09/032,352, filed on May 27, 1998, now abandoned.

(51) Int. Cl.$^7$ .............................................. G06F 3/00
(52) U.S. Cl. ........................... 719/313; 705/1; 707/101
(58) Field of Search .................................. 719/313, 310; 705/1; 707/100, 101, 201; 709/310–332, 203–207, 217–219, 227–229

(56) References Cited

U.S. PATENT DOCUMENTS

| | | | |
|---|---|---|---|
| 4,939,689 A | * 7/1990 | Davis et al. ................. 707/102 |
| 5,333,252 A | * 7/1994 | Brewer et al. .............. 715/506 |
| 5,392,390 A | 2/1995 | Crozier ........................ 395/161 |
| 5,491,818 A | 2/1996 | Malatesta et al. ........... 395/600 |
| 5,623,515 A | 4/1997 | Seto | |
| 5,701,423 A | 12/1997 | Crozier | |
| 5,708,828 A | * 1/1998 | Coleman .................... 715/523 |
| 5,802,381 A | 9/1998 | Matsumoto et al. | |
| 5,826,024 A | 10/1998 | Higashimura et al. | |
| 5,845,283 A | 12/1998 | Williams et al. | |
| 5,898,874 A | 4/1999 | Gelfenbain | |
| 5,920,717 A | 7/1999 | Noda | |
| 5,999,937 A | * 12/1999 | Ellard ......................... 707/101 |
| 6,034,314 A | 3/2000 | Koike .......................... 84/600 |
| 6,216,131 B1 | * 4/2001 | Liu et al. ..................... 707/102 |
| 6,496,835 B2 | * 12/2002 | Liu et al. ..................... 707/102 |

OTHER PUBLICATIONS

Su, Stanley, Y. W.et al. "A methodology of Application Program Analysis and Conversion Based on Database Semantics." 1977.*
Lee, Jintae et al. "Partially Shared Views: A Scheme for Communicating among Groups that Use Different Type Hierarchies." ACM 1990.*
Adam, Nabil et al. "EDI through A Distributed Information Systems Approach." IEEE. 1998.*
OpenCon Communication Systems, Inc. "Billing Mediation Software." White Paper.*

* cited by examiner

*Primary Examiner*—Lewis A. Bullock, Jr.
(74) *Attorney, Agent, or Firm*—Kirk D. Wong; Hickman Palermo Truong & Becker LLP

(57) ABSTRACT

A method and apparatus for converting codes between applications is provided. User defined conversion rules are applied to either convert an internal code into one or more external codes, or to convert one or more external codes into an internal code. Each code conversion rules specifies the conversion between an internal value and one or more external values, and may specify criteria that is met before the code conversion rule is applied. A set of code conversion rules are associated with a user defined code conversion category. The code category may be assigned to one or more fields. When a code is being converted for the field, a conversion rule associated with the code category is applied to convert the code. One or more user specified search key values define criteria for a code conversion rule that are met before the code conversion rule is applied. A user specifies fields that supply values to associate with codes that are being converted. The supplied values are compared with the search key values associated with a code conversion rule to determine whether the particular code conversion rule applies.

42 Claims, 8 Drawing Sheets

| | Category 310 | First Key 315-1 Industry | Second Key 315-2 Customer | Third Key 315-3 Site | Internal Value 324 | External Value 328 | External Value 330 |
|---|---|---|---|---|---|---|---|
| 368 | UOM | RETAIL | ACME | NY | DOZEN | DOZ | |
| 366 | UOM | RETAIL | ACME | | DOZEN | DZN | |
| 365 | UOM | RETAIL | | | DOZEN | DZ | |
| 364 | UOM | | | | DOZEN | 12 EACH | |
| 362 | UOM | | | | EA | EACH | |
| 370 | TERMS | | | | 2 NET 30 | .02 | 30 |
| | | | | ••• | | | |

Search Keys Columns 315 | External Value 332

Code Conversion Rule Table 300

Fig. 3

APPLICATION CODE CONVERSION ARCHITECTURE

RELATED APPLICATIONS

The present application is a continuation of U.S. application Ser. No. 09/032,352, entitled "Application Code Conversion Architecture", filed on May 27, 1998, now abandoned, by Garret Minakawa, et al., the contents of which are herein incorporated by reference.

FIELD OF THE INVENTION

The present invention relates to a method for code conversion, and in particular, to the conversion of codes used by applications.

BACKGROUND OF THE INVENTION

As business relationships integrate, more organizations in all industries (e.g., consumer goods, electronics, health, automotive, transportation, government) exchange data electronically. Due to the expeditious movement and accuracy of electronically transmitted data, overall costs and business cycle times are reduced, and productivity and customer service and satisfaction are improved. The electronically communicated data, formerly seen only in paper documents, typically represents standard transactions used in all business cycles, such as pre-order business, procurement/order fulfillment, forecasting, shipping, financial/payment, quality data, environmental data reporting, even government and tax reporting. Usually these transactions are very routine and occur in high volume, e.g. purchase orders, invoices, payments, forecasts, resale and inventory reports. Upon receipt of the electronically communicated data, the receiving party interprets the data to extract data needed to conduct business. Organizations which electronically exchange data in the above manner are called "trading partners". The entire process surrounding the movement of data representing standard transactions is called Electronic Data Interchange (EDI).

Data can be exchanged in proprietary formats, which the trading partners must agree upon. Usually the proprietary formats are designed by one of the trading partners. However, data is exchanged more efficiently if exchanged in a universally recognized format referred to as "EDI standards".

Two universally recognized standards are the ASC X12 and UN/EDIFACT standards. For various electronic transactions, EDI standards define a structure (physical layout) and syntax for data. In addition, each standard provides a data dictionary that defines data elements, and, if appropriate for a particular data element, a set of codes representing various values of the data element.

For example, the ASC X12 Purchase Order transaction defines data segments or records, and the order to the data segments. The data segments consists of data elements, some of which may contain pre-defined codes. For example, one data element, a date element, represents a generic date. A second data element, a data/time qualifier, precedes the date element. The date/time qualifier indicates the type of date represented by the date element (e.g. delivery date, ship date, or many other types of date). Definitions of electronic transactions, using the EDI standards, make it possible for all trading partners to consistently interpret the business data.

Need for Code Conversion

An organization often defines for their own internal applications a set of codes ("internal application codes") that differ from externally recognized sets of codes ("external codes"), such as those prescribed by EDI standards, or those defined by trading partners. In order to electronically exchange data, it is often necessary to convert internal application codes to externally recognized codes.

For example, the code 'EACH' may be used to represent the unit of measure 'each' in an internal business application. However, the unit of measure 'each' is represented by 'EA' in the ASC 12 standard, or 'PC' in the UN/EDIFACT standard, or may be represented by 'PIECE' by a particular trading partner to their internal application.

Code conversion is not limited to converting one single code to another single code ("one-to-one code conversion"). Sometimes, one code is converted into several codes or values ("one-to-many code conversion"), or several codes or values are converted into one code ("many-to-one code conversion"). For example, consider the code "NET 10/20", which represent payment terms meaning 10% discount if paid in 20 days. In a one-to-many code conversion, the code "NET 10/20" may be converted to the values "0.10" and "20". In a many-to-one code conversion the values, "0.10" and "20" may need to be converted to "NET 10/20".

Traditional Processing of Outbound EDI Transactions

Referring to FIG. 1, computer system 104 is controlled by trading partner A. Data resides in the application 108. An interface program 110 extracts the data from the application and optionally performs code conversion. Eventually the data is received by their EDI Translator 120.

Software for EDI Translators is usually purchased. The EDI translator performs many standard procedures for processing EDI transactions. It monitors EDI activity for a company, defines trading partnerships, tracks which transactions are processed and the particular EDI standard followed by a given trading partner. The EDI translator also formats data to a particular EDI standard.

Communication software 132 receives data from EDI translator 120 and transmits the data to a trading partner. The communication software 132 may transmit the data across any type of communication mechanism, such as third party networks (including the Internet) and internal networks.

To illustrate the process for an outbound transaction, the following example is provided. Application 108 has a data element containing the code 'EACH' representing a unit of measure of a purchase order item. However, the ASC X12 standard specifies that the code for the same unit or measure is 'EA', and the EDIFACT standard specifies 'PC'. So interface program 110 converts the code 'EACH' to 'EA' and 'PC', and writes the codes to an interface file. The interface file is sent to the EDI Translator 120. The EDI Translator 120 will choose the X12 code 'EA' for trading partners using the X12 standard, and the EDIFACT code 'PC' for trading partners using the EDIFACT standard when it writes data for the standard transaction. Data for standard transactions are communicated to the appropriate trading partner through communication software 132, using a communication mechanism of choice.

Traditional Processing of Inbound EDI Transactions

Referring to FIG. 1, computer system 150 is controlled by the second trading partner B. The inbound EDI transaction process is performed in the reverse order of the outbound EDI transaction process noted above. Data for inbound EDI transactions is received from trading partners through a communication mechanism of choice by a communication process 134. After communication process 134 receives the data, the first process to handle the data is EDI Translator 140.

The EDI Translator usually writes the received data to a file in a format suited for interface program 145. Interface program 145 may then convert codes contained in the file. When all processes are successfully completed, the data is loaded into the applications 160.

To illustrate this inbound process, the following example is provided. The inbound process is the reverse of the outbound EDI process. The trading partner B receives data as an ASC X12 purchase order transaction. The data is received from a trading partner through the communication mechanism of choice by communication process 134. When the data is received by the EDI Translator 140, EDI translator recognizes the X12 unit of measurement code 'EA'. The EDI translator writes the data to an interface file for interface program 145. The interface program 145 converts the X12 code 'EA' to the corresponding code used by application 160, which is 'PIECE'. Data for the purchase order transaction is then loaded into the application 160. Note that the sending party's code conversion of 'EA' does not match the receiving party's code conversion result. One party used 'EACH' while the other party used 'PIECE'. Their use of the data is same. Specifically, both use their own respective codes to represent the same unit of measurement, i.e. the unit of measure that conveys a single unit Where to Perform Code Conversion Code conversion can be applied in one or more of the following mechanisms:

EDI Translator software using scripting languages interpreted by EDI Translators.

Proprietary software that resides between the EDI translator and the application of the trading partner, or resides with the application.

Applying code conversion in EDI translators using scripting languages or in proprietary software requires the development of customized software. One disadvantage of developing customized software is the high cost of development. For example, there is the cost of the development staff or temporary consultants to develop the customized programs. The development process can require substantial resources to document user requirements, high level designs, detail level designs, coding, testing, implementation, as well as writing system and user documentation. After implementation, the programs must be maintained and changes may be required. Over the life of the customized software, maintenance costs may be substantial.

It is often desirable to avoid custom programs due to substantial costs. It is therefore desirable to provide a method of converting codes without the necessity for developing programs customized to convert codes.

SUMMARY OF THE INVENTION

A method and apparatus for converting codes between applications is described. User defined conversion rules are applied to either convert an internal code into one or more external codes, or to convert one or more external codes into an internal code. Each code conversion rules specifies the conversion between an internal value and one or more external values, and may specify criteria that is met before the code conversion rule is applied.

According another aspect of the invention, a set of code conversion rules are associated with a user defined code conversion category. The code category may be assigned to one or more fields. When a code is being converted for the field, a conversion rule associated with the code category is applied to convert the code.

According to another aspect of the invention, one or more user specified search key values define criteria for a code conversion rule that are met before the code conversion rule is applied. A user specifies fields that supply values to associate with codes that are being converted. The supplied values are compared with the search key values associated with a code conversion rule to determine which the particular code conversion rule to applies.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is a block diagram depicting an exemplary rule set table representing exemplary conversion rules according to an embodiment of the present invention;

FIG. 5 is a block diagram depicting an exemplary transaction view through which codes from an application are extracted according to an embodiment of the present invention;

DETAILED DESCRIPTION OF THE PREFERRED EMBODIMENT

A method and apparatus for converting codes is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
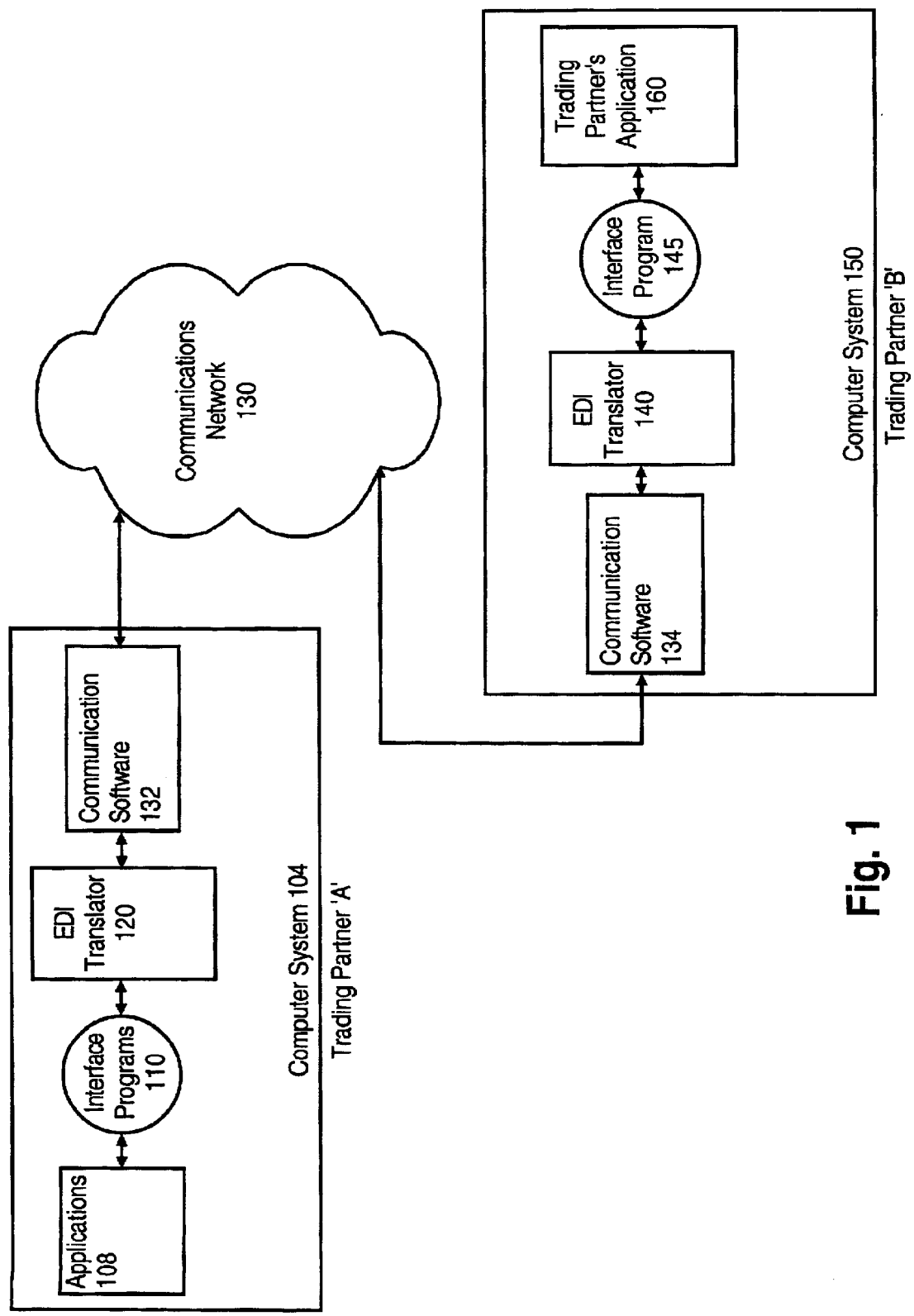
FIG. 1 is a block diagram depicting an exemplary system for exchanging data.
Figure 2:
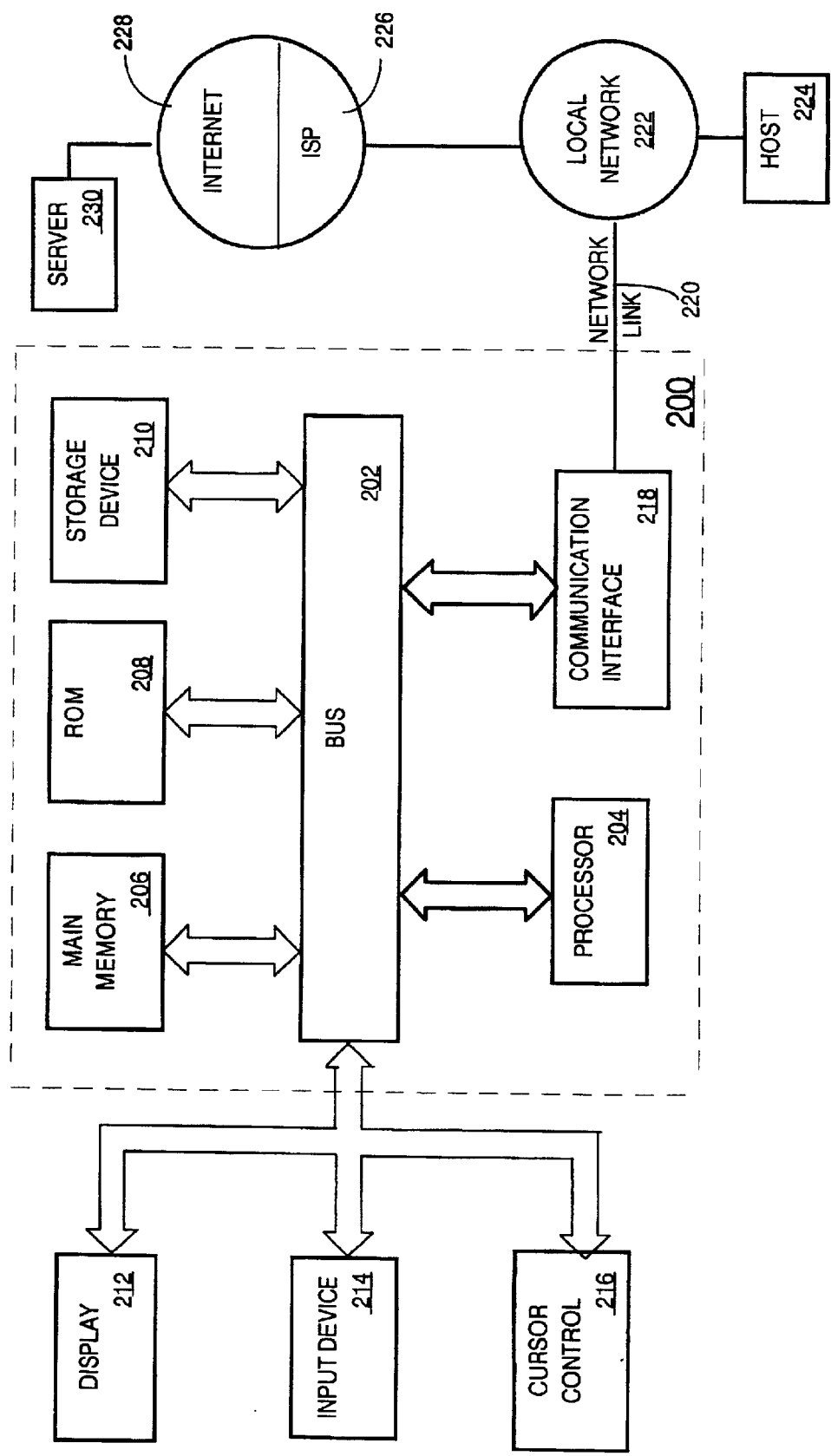
FIG. 2 is a block diagram depicting a computer system upon which an embodiment of the present invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also maybe used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for converting codes. According to one embodiment of the invention, converting codes is provided by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the word wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit requested program code for an application program through Internet 228, ISP 226, local network 222 and communication interface 218. In accordance with the invention, one such downloaded application provides for converting codes as descried herein.

The received code may be executed by processor 204 as it is received, and/or stored in storage device 210, or other non-volatile storage for later execution. In this manner, computer system 200 may obtain application code in the form of a carrier wave.

Functional Overview

A code represents any business data in an application. For example, the unit of measurement data element, which is found in most business transactions, may be represented by code values meaning box, bulk, bottle, each, barrels, coils, etc. As mentioned before, an application may use internal application codes 'BOX', 'BULK', 'BOTTLE', 'EACH', 'BARREL', and 'COIL'. However, another process that must interpret codes for units of measure, may use the code values of 'BX', 'BN', 'BO', 'BR', and 'CX' respectively. Business wise, the same physical units of measurement are conveyed, i.e., products are shipped or received in boxes, bottles, and coils.

According to another aspect of the present invention, user defined conversions rules are used to define the conversion of a particular source code into a particular resultant code. In an embodiment of the present invention, the conversion rules are stored in a table. The user defined conversions rules provide significantly more flexibility than custom software where the rules are hard coded. A single internally defined code can determine multiple external codes to associate with it. And, vice versa, multiple codes from external data can determine a single internal code. This flexibility accommodates transactions and their codes, whether they are inbound or outbound transactions to the process.

Additionally, any code conversion rule can apply universally, or any code conversion rule can be limited to apply to a specific criteria, if limiting search keys are provided. If a code conversion rule applies to all entities, then no search key criteria is entered with the data. If the code conversion rules apply only to specific entities, then flexible search key criteria is defined for the conversion rule. For example, if Transportation Carrier codes apply to all business entities, then no search keys are indicated. If the Transportation Carrier codes apply to only specific entities, such as a specific trading partner or trading partner's location, then search keys for that trading partner or location are defined.

According to another aspect of the invention, a code conversion category is used to represent a subset of code conversion rules. Any code conversion category can be assigned to one or more data elements in one or more transactions. This substantially reduces duplicate data entry of code conversion rules associated with the code conversion category, since the code conversion rules are reusable within and across transactions. Hence, the UOM category can be assigned to data elements found in the purchase order line detail, invoice line detail, or any transaction at any level in order to activate the code conversion. If no Code Conversion Category is assigned to the data element within a transaction, code conversion is not performed.

The Code Conversion Categories are easily defined and assigned to data elements in transactions by the user any time they wish. New code conversion categories and any code conversion category assignments to data elements are effective immediately in the table. There is no need to recompile programs or expend resources to do recompiles.

A conversion software engine is responsible for applying the conversion rules in order to convert codes. The conversion engine determines which conversion rules associated with a code conversion category to apply, based on a hierarchy of search keys associated with code conversion category. Specifically, the code conversion process performs searches for a code conversion rule based on a set of search keys that includes all search keys associated with the respective code conversion category. If this search yields no code conversion rule, then highest numbered (i.e. highest in the hierarchy) search key remaining in the set of search keys is removed, and another search is commenced. Subsequent searches are conducted in this manner until a search yields a code conversion rule, or until all that is left to search is the default code conversion rule (i.e. the conversion rule for which no search key values are specified). From the previous example, if the search for the specific customer site returned no values, a subsequent search is made for the customer level entries. If that search for customer level entries returns no values, the default for the universal applicable conversion rule is returned. Several hierarchical levels of search keys may be set up for a code conversion category.

There are three functions to perform in order to create and activate a set of code conversion rules. These functions are:

(1) Defining a code conversion category to associate with a subset of code conversion rules.

(2) Assigning a code conversion category to a given data element to activate code conversion for that given data element.

(3) Defining for the code conversion category, conversion rules that each specify a conversion between an internal application code and one or more external codes.

Code Conversion Rule Table

The techniques described herein are for the code conversion between an internal code and one-to-many external codes in accordance with code conversion rules. Before those techniques are described, a description of an exemplary data structure for representing code conversion category rules is helpful.

Referring to FIG. 3, Code Conversion Rule table 300 contains one or more rows that each corresponds to a code conversion rule, and columns that represent data attributes of the code conversion rule. The columns are as follows:

The column Category 310 contains the name of the code conversion category associated with the code conversion rule represented by a row.

The column Internal Value 324 contains a value representing an internal code used by an internal application using these code conversion rules.

The columns External Value 328 and External Value 330 each contain an external value for an external code needed by entities such as EDI standards or trading partners.

The columns Search Keys 315 represent an ordered set of search keys, and contain search keys values that define criteria for the code conversion rule represented by a row.

An internal code is converted into an external code, or vice versa, depending upon the direction of a transaction for which the conversion is being performed. Inbound transactions need the internal code for the internal application; outbound transactions need the external code for data mapping in the EDI translator.

For example, row 362 represents a code conversion rule that specifies that the internal code 'EA' is associated with the external code 'EACH' when the code conversion category 'UOM' is specified in a code conversion rule for a data element. Since no search key values are entered on the row, the code is not limited to specific criteria, such as a particular trading partner ACME.

For an outbound transaction, row 370 represents a one-to-many code conversion rule. In particular, the code conversion rule specifies that the code "2 NET 30" is converted into a first external value "0.02" and second external value "30". Note, that for an inbound transaction, the code conversion rule specifies a many to one conversion. In particular, the code conversion rule specifies that the first external value "0.02" and second external value "30" code are converted into the code.

The term table refers to storage organizations used to hold data in a database. Herein, the term table is broadly defined to be data structure containing one or more categories of data and includes, but is not limited to, object-relational tables and relational tables.

In an embodiment of the present invention, Search Keys 315 includes an ordered set of search key columns such as first key 315-1, second key 315-2, and third key 315-3. Each of the search key columns of Search Keys 315 is associated with an order in a hierarchy. First search key 315-1 is first in order, second search key 315-2 is second in order, and third search key 315-3 is third in order (the highest numbered search key in this case).

Each search key column may be used to specify one criterion that must be satisfied for the rule to apply. As shall be explained in greater detail, a code conversion engine applies the code conversion rule with the most specific, fully satisfied criteria. A user associates a search key column with a particular field. These particular fields supply search key values associated with a code that is being converted by a code conversion engine.

For example, assume that the internal application code 'DOZEN' is to be used to populate a field associated with the code conversion category 'UOM'. Assume also that supplied along with the internal application code "DOZEN" is a first level key having a value "RETAIL". The value is supplied by the field associated with search key 315-1, which is the industry field in a vendor table. Assume that the field to be populated is a unit of measure field in the purchase order item file. The code "DOZEN" and the key value supplied with the code match the criteria specified by search key 315-1 of row 365. Specifically, the value for search key 315-1 for row 365 ("RETAIL") matches the supplied first level key value "RETAIL". Thus, the rule represented by row 365 may applied, and, accordingly, code "DOZEN" is converted to "DZ". A more detailed description of applying a code conversion category rule set shall be provided.

Exemplary System for Exchanging Data

Figure 4:
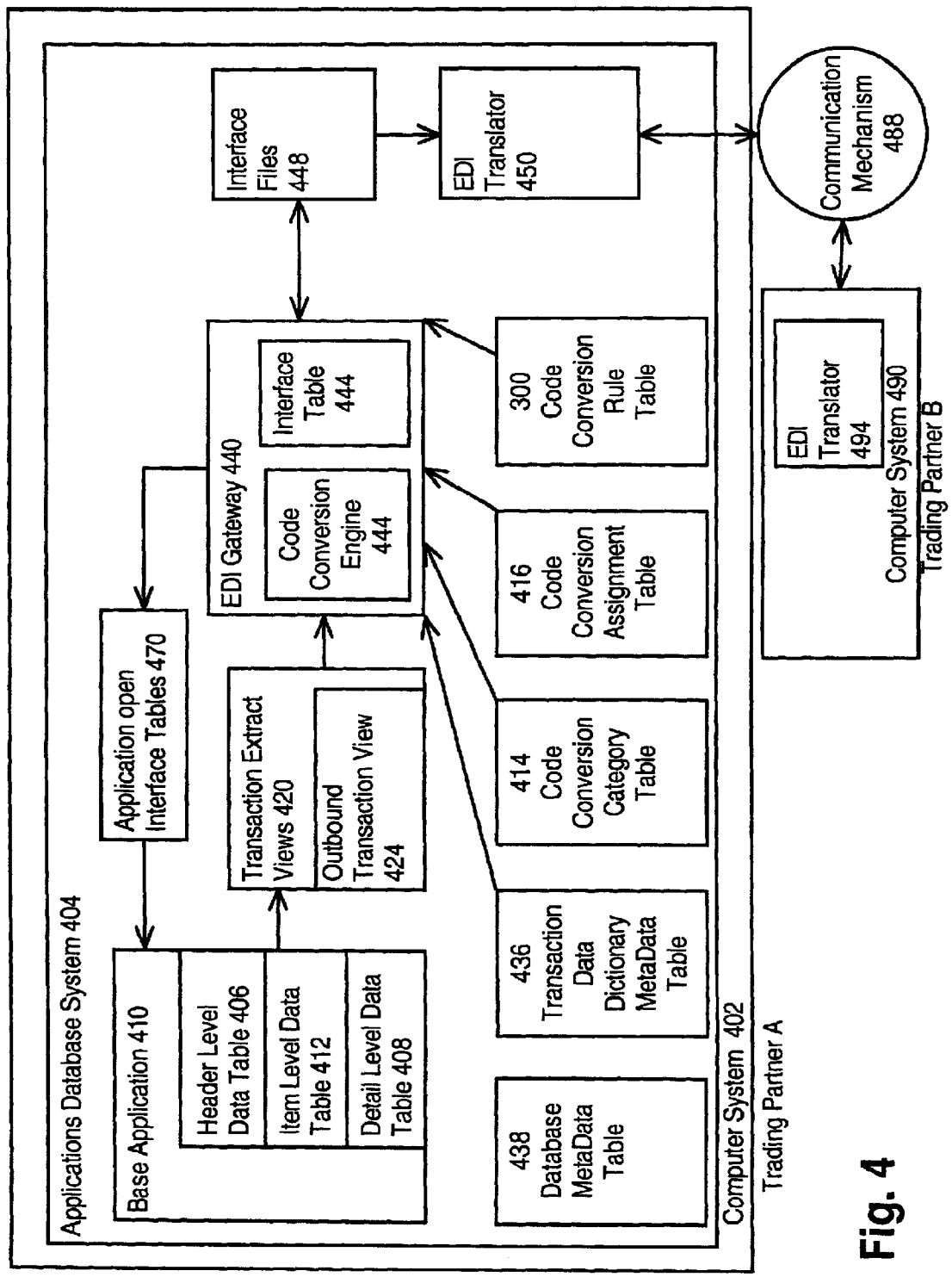
FIG. 4 is a block diagram depicting an exemplary system for exchanging data according to an embodiment of the present invention.

To facilitate an understanding of the techniques described herein, the present invention is described within the context of trading partners exchanging data. FIG. 4 shows an exemplary system for exchanging data between trading partners.

Referring to FIG. 4, trading partners exchange data between their respective computer applications: the sending trading partner's is base application 410 on computer application data base system 404, and the receiving trading partner's computer application (not shown) is on computer system 490. The application data base system 404 includes a data base manager (not shown) that manages all the applications.

The components relating to the EDI process and the processes followed for an outbound transaction include the following:

(1) Base applications 410 include data, software, and processes for applications such as purchasing or order entry. The base application 410 may comprise data base application levels of data which are stored in tables, for example:
  (a) Header level data table 406
  (b) Item level data table 412
  (c) Detail level data table 408
(2) The outbound transaction data is extracted for the base application 410 using specific transaction extract views 420. The creation and use of views are well known to those skilled in the art and shall not be further described.
(3) Database metadata 438 defines the various tables and views within application database system 404.
(4) Code conversion is applied to the application internal codes in accordance with the code conversion rules and data specified in the following tables:
  (a) Code Conversion Category table 414
  (b) Code Conversion Assignment table 416
  (c) Code Conversion Rule table 300
(5) Data is extracted from base application 410 and moved to interface tables 446. Data from interface tables 446 is written to interface files 448. Before the data is written to interface files 448, the conversion rules are applied by code conversion engine 444.
(6) The interface files 448 are files formatted according to transaction file definitions found in the transaction data dictionary metadata table 436.
(7) The EDI Translator 450 reads data from interface files 448 and formats the data according to EDI standards or other file layouts agreed upon by trading partners. This format is usually a customary EDI standard format, e.g. ASC X12 or EDIFACT.
(8) The data is then communicated to the computer system of the trading partner, i.e. computer system 490.

An inbound transaction is processed in a manner reverse to that described above for an outbound transaction, except that EDI Gateway 440 loads the data and converted codes into application open interface tables 470. The base application 410 has the responsibility to validate the data. Validated data is loaded into the application tables of base application 410. Rejected transactions are passed to an error handling mechanism (not shown).

Defining Code Categories

Figure 5A:
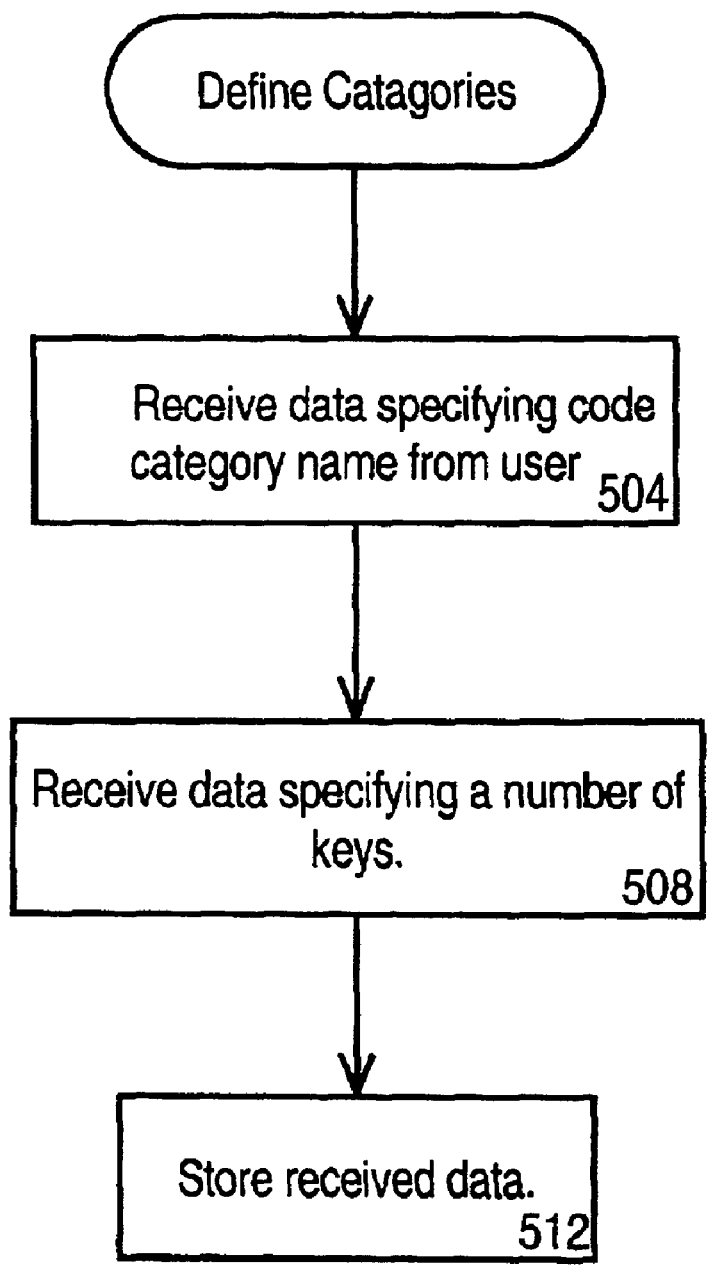
FIG. 5A is a flow chart showing steps for defining a code conversion category according to an embodiment of the present invention.

A code conversion category must be defined before the code conversion category may be associated with a field and before rules may be established for the code conversion category. FIG. 5A shows the steps for defining a code conversion category. Defining a code conversion category entails receiving data from a user specifying a code conversion category name and a number representing the maximum number keys that may be included in any code conversion rule belonging to the code conversion category. Any well known user interface mechanisms may be used to receive this data from a user, including well know graphical user interface mechanisms. The steps of FIG. 5A are illustrated by example using the code conversion category UOM.
(1) Referring to FIG. 5A, at step 504, data specifying a code conversion category name is received from a user. In this example, the string "UOM" is received from a user.
(2) At step 508, data specifying a maximum number of keys is received from the user. In this example, a character representing the number 3 is received. At step 512, the data received in steps 504–508 is stored in code conversion categories table 414.

Associating Code Categories and Fields

Figure 5B:
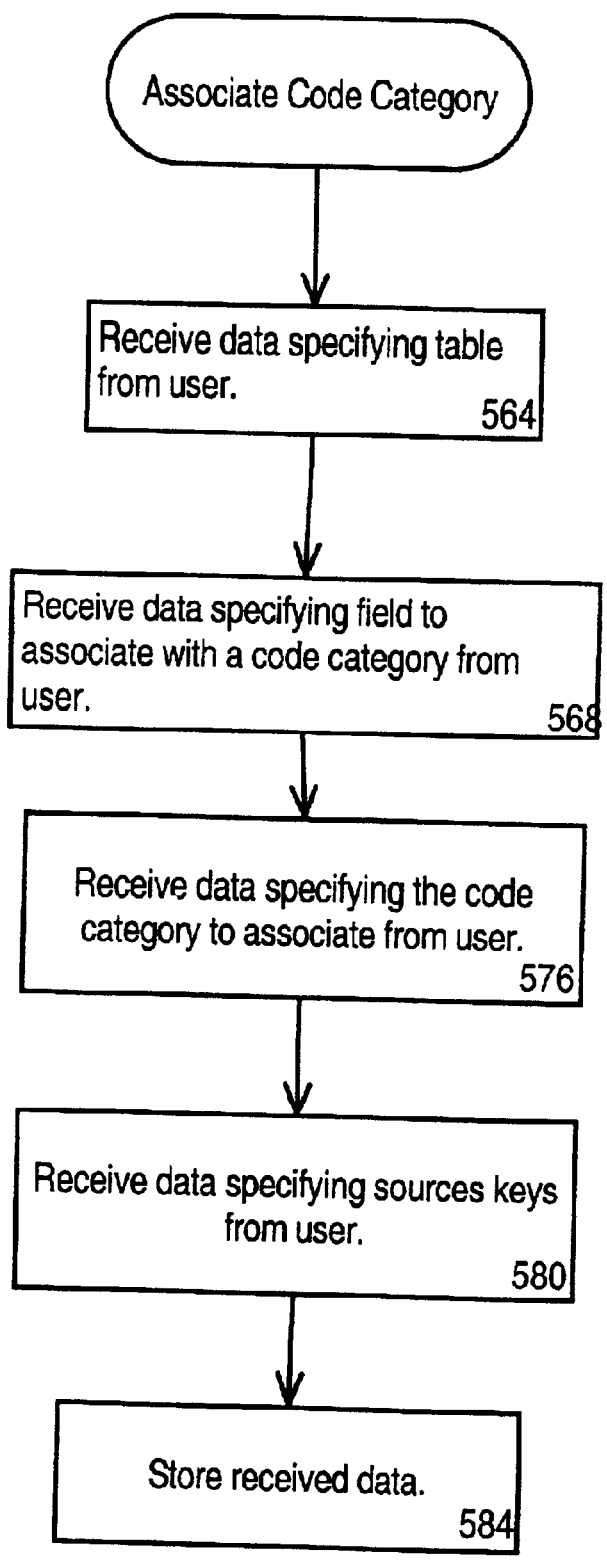
FIG. 5B is a flow chart showing steps for associating code categories according to an embodiment of the present invention.

Code conversion categories may be associated with one or more fields. Once the code conversion category is associated with a field, whenever code conversion engine 444 retrieves a code to convert, the code conversion engine 444 determines whether a code conversion rule should be applied. If a code conversion rule should be applied, the code is converted. FIG. 5B shows the steps performed to associate a code conversion category with a field.

Associating a code conversion category with a field entails receiving data from a user specifying the field with which to associate a code conversion category, and receiving data from a user specifying sources of data for keys defined for the code conversion category rule set. Any well known user interface mechanism may used to receive data from a user, including well know graphical user interface mechanisms.
(1) Referring to FIG. 5B, at step 564, data from the user specifying a table or view that contains the field to associate is received. In this example, data specifies view outbound transaction view 424, a view included in transaction extract views 420. Outbound transaction view 424 is based on header level data table 406, item level data table 412, detail level data table 408.

(2) At step 568, data specifying the field to associate is received from the user. In this example, a list box that lists the columns of outbound transaction view 424 is presented to the user. The list box is populated with selections representing columns by querying database metadata 438 for the columns of outbound transaction view 424 and invoking utilities for establishing selections in a list box in accordance with mechanisms and techniques well know to those skilled in the art. Based on the list box selection that is made by the user, data 110 is received specifying column item unit of measure field.

(3) At step 576, data specifying the code conversion category to associate is received from the user. In this example, data is received specifying that the category to associate is code conversion category UOM.

(4) At step 580, data specifying the sources of data for the one or more keys is received from the user. In one embodiment of the invention, the number of sources specified is the maximum number of keys corresponding to the code conversion category being associated. The source of data is the data presented by the transaction view mapped, by transaction data dictionary metadata 436, to the table or view specified by the user in step 564. In this example, the maximum number of keys associated with code conversion category UOM is three, and outbound transaction view 424 is the transaction view specified by the user at step 564. Accordingly, three list boxes presenting as selections the columns of outbound transaction view 424 are presented to the user. Based on the selection made by the user through the list boxes, data is received specifying that the source of data for key 315-1 is industry, customer, and site.

(5) At step 584, data received through the performance of steps 564–580 is stored in code conversion assignment table 416. In one embodiment of the present invention, in code conversion assignment table 416 is a relational table with columns for storing the data received while performing the steps for associating a code conversion category with a field. Each row in the table represents an association between a field and a code conversion category, and contains columns having values indicating the associated field and code conversion category, and the sources of data of the respective keys.

Establishing Conversion Rules for a Code Conversion Category

Figure 6:
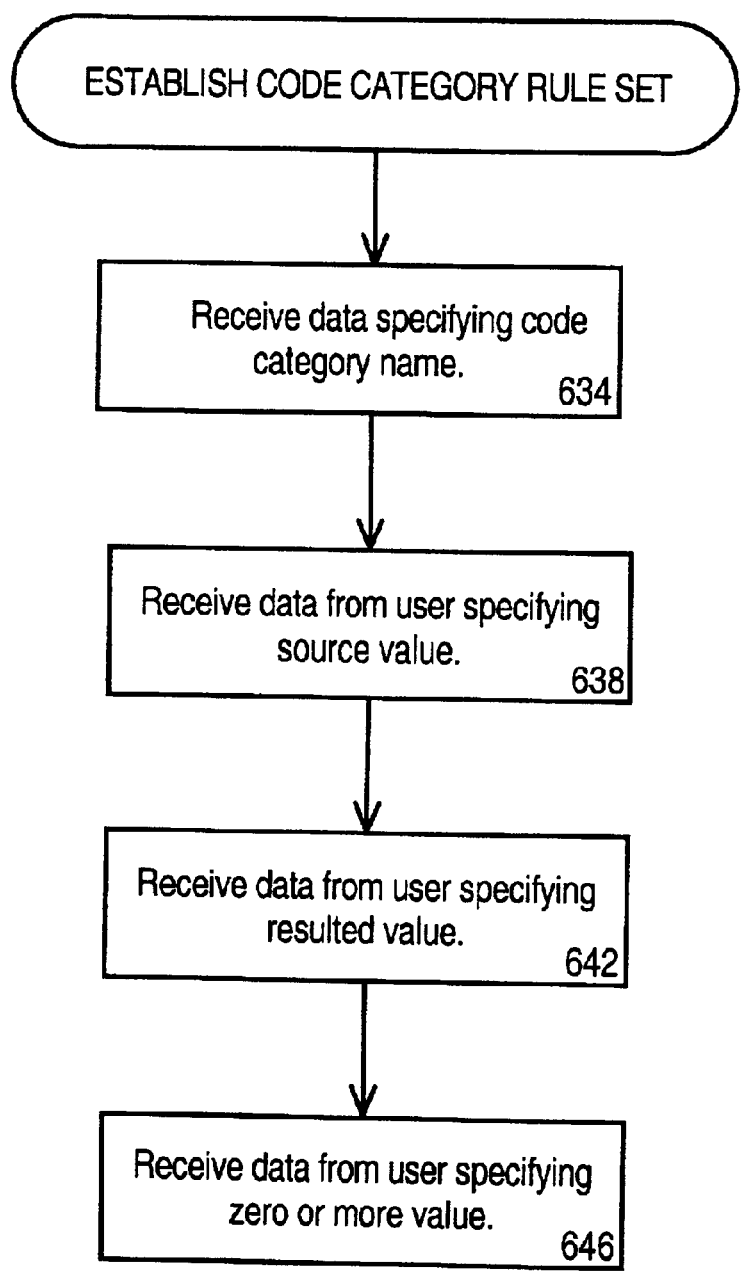
FIG. 6 is a flow chart showing steps for establishing a code conversion category rule set according to an embodiment of the present invention.

Once a code conversion category is defined, the code conversion rules may be defined for the code conversion category. FIG. 6 shows the steps for defining code conversion rules for a code conversion category. Establishing code conversion rules entails receiving, for each code conversion rule, data from a user specifying the code conversion category name, internal value 324 (FIG. 3), one external value 328, (optionally) external value 330, and (optionally) values for search keys 315. In one embodiment of the present invention, a well known graphical user mechanism referred to as a grid is presented to the user. The grid consists of rows and columns, where each row represents a particular code conversion rule. A grid column is provided for receiving data for internal value 324 (FIG. 3), external values 328 and 330, and values for each of keys 315. The number of grid columns for keys 315 is based on the maximum number of keys defined for the code conversion category in code conversion assignment table 416. The grid is similar in appearance to the depiction of code conversion rule table 300.

The steps of FIG. 6 are illustrated by an example based on code conversion rule table 300. In the example, the user specifies the rule:

(1) for outbound transactions, convert "DOZEN" into "DOZ" when VENDOR INDUSTRY="RETAIL", CUSTOMER="ACME", and CUST_LOCATION= "LA"; and (2) for inbound transactions, convert "DOZ" into "DOZEN" when VENDOR INDUSTRY="RETAIL", CUSTOMER="ACME", and CUST_LOCATION= "LA"

(1) Referring to FIG. 6, at step 634, data specifying a code conversion category name is received from the user. In this example, data specifying UOM as the code conversion category name is received.

(2) At step 638, data specifying internal value 324 for a particular code conversion rule is received from the user. In this example, the user is entering data for the code conversion rule corresponding to row 366 (FIG. 3). The string "DOZEN" is received and stored in code conversion rule table 300.

(3) At step 642, data specifying external values is received from the user. In the current example, the user is entering data for the conversion rule corresponding to row 368 (FIG. 3). The string "DOZ" is received for external value 328 and stored in code conversion rule table 300.

(4) At step 646, data specifying zero or more values for keys is received from the user. In this example, the strings "RETAIL", "ACME", and "NY" are received as values for key 315-1, key 315-2, and key 315-3 respectively. The values are stored in code conversion rule table 300.

(5) Steps 634, 638, 642, and 646 are repeated to receive data for other conversion rules that will belong to the code conversion category rule set. In this example, by repetition of the steps 634, 638, 642, and 646 for each remaining conversion rule represented in code conversion rule table 300, data is received from a user specify values as shown in code conversion rule table 300. The remaining rows represent conversion rules for outbound transactions as follows:

For code conversion category UOM:

Row 366
  convert "DOZEN" into "DZN" when VENDOR INDUSTRY="RETAIL", and CUSTOMER= "ACME", (outbound),
  convert "DZN" into "DOZEN" when VENDOR INDUSTRY="RETAIL", and CUSTOMER= "ACME", (inbound), Row 365
  convert "DOZEN" into "DZ" when VENDOR INDUSTRY="RETAIL", (outbound),
  convert "DZN" into "DOZEN" when VENDOR INDUSTRY="RETAIL", (inbound), Row 364
  convert "DOZEN" into "12 EACH", (outbound),
  convert "12 EACH" into "DOZEN", (inbound), and Row 362
  convert "EA" into "EACH", (outbound),
  convert "EACH" into "EA", (inbound).

For code conversion category TERMS:

Row 367
  convert "2 NET 30" into "0.02" and "30", (outbound)
  convert "0.02" and "30" into "2 NET 30", (inbound).

Converting Code Sets

Figure 7:
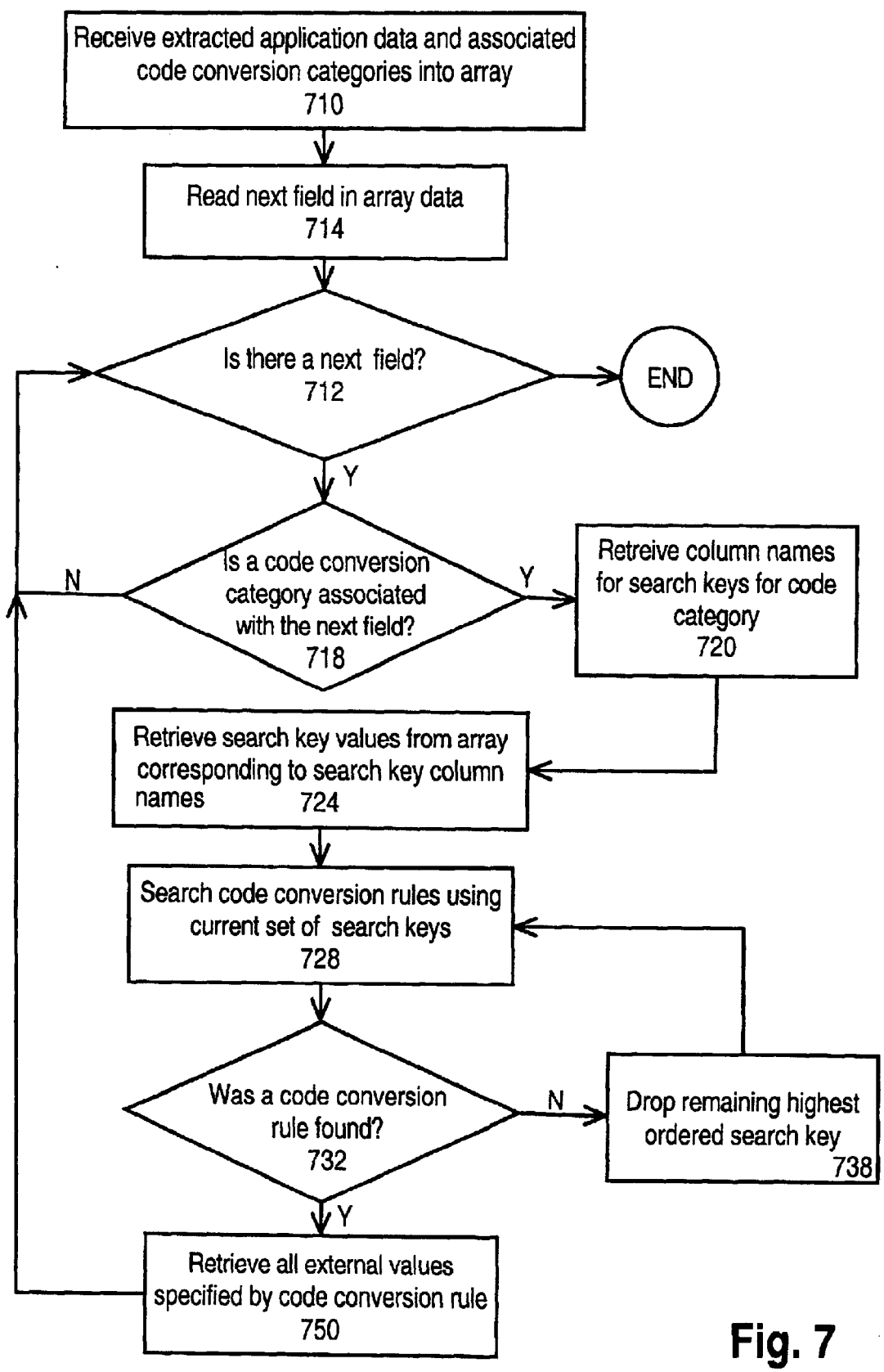
FIG. 7 is a flow chart showing steps for converting codes according to an embodiment of the present invention.

FIG. 7 shows steps for performing code conversion based on the given set of code conversion rules associated with a field. According to one embodiment of the present invention, the steps are performed as part of the process for generating EDI transaction data.

Before the steps are performed for outbound transactions, EDI Gateway 440 extracts data that is eventually written to interface files 448. Specifically, the EDI Gateway extracts data through one of transaction extract views 420. The extracted data represent one transaction type. For each transaction. EDI Gateway 440 passes the portion of the extracted data corresponding to the transaction.

For example, EDI Gateway 440 may extract data through the outgoing purchase order transaction view, as mentioned before, which is based on header level data table 406, item level data table 412, detail level data table 408. Each transaction represents the ordering of one or more purchase order items (e.g., a part, service). A partial list of the extracted data elements ("extracted data fields") include:

(1) an internal customer field,
(2) an internal industry field (i.e. the industry of the customer),
(3) an internal site field (i.e. one site of a set of sites that may be associated with a customer),
(4) an internal item number,
(5) one or more internal unit of measure fields, i.e. (a unit of measure field for each item ordered).

The steps of FIG. 7 are illustrated using the data extracted through the purchase order item view presented above, and the code conversion rules represented by the code conversion rule table 300. Assume the values for extracted data fields include:

| Internal Industry Field | Internal Customer Field | Internal Site Field | Internal Unit of Measure Field(s) | Internal Item Number |
|---|---|---|---|---|
| "RETAIL" | "ACME" | "LA" | "DOZEN" | "248" |

(1) At step 710, the extracted application data and associated code conversion category(s) are received by code conversion engine 444. In this example, an array containing the values shown above for the extracted data fields is received. The array includes array elements for each extracted data field, and array elements indicating the code conversion category associated with a particular data field, if any.

(2) At step 712, a value is read from the next field in the array, if any. This field is referred to as the current field. In this example, assume the current field is the unit of measure field of the first item of the purchase order transaction at issue. The value read is 'DOZEN'.

(3) At step 714, it is determined whether a next field was read. If there was no next field read, the execution of the steps ceases. Otherwise, control passes to step 718. In this example, no extracted data field has been yet read. Therefore, control passes to step 718.

(4) At step 718, it is determined whether a code conversion category is associated with the current field. If no code conversion category is associated with the current field, then control passes to step 712, to read the next field after the current field. If a code conversion category is associated with the current field, then control passes to step 720. The code conversion category associated with the current field is referred to as the current code conversion category. In this example, the current field is associated with the code conversion category UOM.

(5) At step 720, the search key column names corresponding to the search columns of the current code conversion category are retrieved. In this example, the search key column names are retrieved by examining the transaction data dictionary metadata 436 to determine which columns are associated with each of search keys 315 for code conversion category UOM. The transaction data dictionary, as mentioned before, indicates that:

(1) the first search key 315-1 is associated with the industry field in the array at the appropriate level, such as the header, line, or detail levels,
(2) the second search key 315-2 is associated with customer field in the array at the appropriate level,
(3) the third search key 315-1 is associated with the site field in the array at the appropriate level.

(6) At step 724, the search key values are retrieved. The code conversion engine 444 retrieves, for each search key, the search key value from the array element corresponding to the data field with which the search key is associated. Thus, the first source key value is "RETAIL" for industry, the second source key value is "ACME" for customer, and the third source key value is "LA" for site.

(7) The loop represented by steps 728 through 738 represent steps for finding the conversion rule whose criteria is most specifically met ("most specific rule"), if any. In particular, the most specific rule is the conversion rule meeting the following criteria for the internal application code "DOZEN" to determine its associated external data value(s) "DZN" for outbound transactions.

(1) The code conversion category associated with the current field agree with the code conversion category in the conversion rule. For example, the code conversion category UOM.
(2) The internal data value agrees with the internal data value in the code conversion rule. For example the internal application code "DOZEN" agrees with the source value "DOZEN".
(3) Each search key value specified for the code conversion rule is matched by the current set of search keys. For example, assume the search key values specified for a code conversion rule are "RETAIL" and "ACME", and the current set of search key values are "RETAIL", "ACME", and "LA". Even though the current set of search key values includes one additional search key value that is not matched, the code conversion rule satisfies criteria (3). Specifically, each search key value specified for the code conversion rule (i.e. "RETAIL" and "ACME") is matched.
(4) The code conversion rule has the highest numbered matched search key relative to any other code conversion rule meeting criteria 1 (i.e. the code conversion category agrees), criteria 2 (i.e. the internal application code agrees with the internal value), and criteria 3 (i.e. all search key values for the code conversion rule are matched). Continuing the preceding example with the search keys "RETAIL", "ACME", and "LA", assume two code conversion rules meet criteria (1), (2), and (3). Criteria (3) is met by all three search keys for the first conversion rule, and by the first two search keys for the second conversion rule. The first code conversion rule has all three of its specified search key values matched. Because its third search key is matched, the number of the highest matched search key is three. The second code conversion rule has only its first two specified search key values matched. Because its second search key is matched, the highest numbered search key is two. Because the first code conversion rule mentioned has the most matched search keys (i.e. three search keys), it is the most specific code conversion rule.

(8) In one embodiment of the present invention, multiple code conversion rules are searched. The multiple searches begins by searching the set of code conversion rules that (1) belong to the current code conversion category, (2) that specify a conversion for the current internal value, and (3) match a set of search keys that initially includes all search keys. If the search with all the search key values returns no code conversion rule, then a subsequent search is conducted with a set key values where the highest numbered search key is removed. The process of reducing the number of search keys continues, until no search keys are left and generic search is conducted with no search keys.

The keys and values shown in the following table illustrate several attempted searches where the remaining highest numbered key is removed. Each search has a less restricted key, i.e. code conversion rules with "RETAIL", "ACME", and "LA" are very limited and apply only to that entity, while the third search with just "RETAIL" will apply to all customers and sites with the RETAIL industry.

| NUMBER OF SEARCH | SEARCH KEYS | | |
|---|---|---|---|
| | Key 1 (Industry) | Key 2 (Customer) | Key 3 (Site) |
| First search with keys 1–3 | RETAIL | ACME | LA |
| Second search with keys 1–2 | RETAIL | ACME | |
| Third search with key 1 | RETAIL | | |
| Fourth search with no keys | | | |

(9) Referring again to FIG. 7, at step 728, a search is conducted for a matching code conversion rule using the current set of search keys. The initial current set of search keys includes all search keys. Control then passes to step 732.

In the example based fields in the array, code conversion rule table 300 (FIG. 3) is scanned for a conversion rule matching the first, second, and third search key values, which are "RETAIL", "ACME", and "LA" respectively. In this example, no conversion rule was found. Note from FIG. 3 that none of the depicted rows match the preceding search key values. Control passes to step 732.

(10) At step 732, a determination is made of whether the code conversion rule was found at step 728. If a code conversion rule was found, then control passes to step 750. Otherwise, control passes to step 738.

(11) At step 738, the highest numbered search key remaining in the current set of search keys is dropped. Control then returns to step 728. In this example, the third search key is dropped from the set of current search keys.

Continuing with the current example, at step 728, a search is conducted for a matching code conversion rule using the current set of search keys. Code conversion rule table 300 (FIG. 3) is scanned for a conversion rule matching the first, and second search key values, i.e. "RETAIL" and "ACME" respectively. In this case, the code conversion rule represented by row 366 is found. At step 732, it is determined that a code conversion rule was found. Control passes to step 750.

(12) At step 750, the external value(s) specified by the found code conversion rule are retrieved. This external value represents the code associated with the current internal application code. In this example, one external value, "DZN", is retrieved from column external value 328, since it is associated with the internal application code "DOZEN".

(13) The example illustrates that steps 728 through 738 represent one technique for determining which particular code conversion rule meets the most specific rule criteria mentioned above. Note that the rules represented by row 368, row 366, row 365, row 364 all meet criteria (1), i.e. the code conversion rule matches the code conversion category UOM, and meet criteria (2), i.e. the respective internal value for each rule is matched by "DOZEN". However, the conversion rule in row 368 does not meet criteria (3) because the third search key value "LA" does not match the value of the third search key column 315-3 (i.e. "NY"). Thus, each search key value specified for the rule is not matched.

In the case of the conversion rule represented by row 366, all the specified search key values are matched, and thus the number of the highest matched search key is two. With respect to the conversion rule represented by row 365, all the specified key values are matched, and the number of the highest matched search key is one. The code conversion rule represented by row 364 is not associated with any key values. When this is the case, all the key values specified for the conversion rule are considered to be matched, and the number of the highest matched search key value is zero. Of all the rules that meet most specific rule criteria (1), (2), and (3), the code conversion rule represented by row 366 has the search key having the highest number. Thus, the conversion rule represented by row 366 is the most specific rule.

(14) Although one technique for determining the most specific rule has been described, alternates are possible. Therefore, it is understood that the present invention in not limited to one technique for determining the most specific rule.

(15) One benefit of using the most specific conversion rule is that a user may enter exception based code conversion rules (i.e., rules directed to the exceptions) for converting codes, thus reducing the amount of data entry required to specify code conversion rules for a code conversion category. Specifically, a "less specific" conversion rule may be established that will always be applied to the most general case, and "more specific" rules may be established for the exceptions.

For example, assume that most of user's trading partners associated with RETAIL industry use the code "DZ" to represent the unit of measure 'dozen'. One exception is the trading partner customer ACME, who uses the code "DZN". Furthermore, customer ACME even has one further exception within its own organization. Customer ACME's New York location uses the code "DOZ" to represent the unit of measure 'dozen'.

The set of code conversion category conversion rules represented by code conversion rule table 300 is an exception based rule set that may be used to convert unit of measure code "DOZEN" to the corresponding unit of measure codes used by the retail trading partners. The rule represented by row 365 represents the general rule that converts the source code "DOZEN" to "DZN". The rule represented by row 366 represents the exception for translating "DOZEN" to "DZN". Finally, the rule represented by row 368 represents the further exception of translating "DOZEN" to "DOZ". For any source associated with a retail vendor (i.e., associated with first key value "RETAIL"), the conversion rule represented by row 365 are applied, except when either the rule represented by row 365 or row 366 are the most specific rule.

Inbound Transaction

For inbound transactions, the conversion engine 444 performs steps similar to that shown for FIG. 7. However, there are some differences.

Data is written from an interface file for inbound transaction data into the array. One or more external code may be retrieved together to determine the internal code. The most specific criteria is based on the one or more external codes associated with the current field. Specifically, the criteria (2) for the most specific rule is: the one or more external values of the rule agree with the external codes associated with the current field.

At step 728, the code conversion rules searched in code conversion table 300 are those that match the current external codes (i.e. the external codes associated with the current field). At step 750, the internal value specified by the found code conversion rule is retrieved and used by the application.

For illustrative purposes only, the techniques described herein have been illustrated with reference to exemplary code conversion rule tables structured to represent conversion rules associated with three search keys and to convert a one internal application code into one or two external codes. Those skilled in the art will recognize that the structure of the code conversion rule table may be easily adapted to support conversion rules specfying a different number of search keys and external codes. For example, the number of keys 315 (FIG. 3) may be expanded to five, and the number of external values 332 may be expanded to five. Therefore, it is understood that the present invention is not limited to code conversion rule tables structured to represent conversion rules associated with any particular number of keys and to convert an internal application code into any particular maximum number of external codes.

In the foregoing specification, the invention has been described with reference to specific embodiments thereof. It will, however, be evident that various modifications and changes maybe made thereto without departing from the broader spirit and scope of the invention. The specification and drawings are, accordingly, to be regarded in an illustrative rather than a restrictive sense.

What is claimed is:

1. A computer-implemented method for converting code values between applications, the method comprising the steps of:

generating first data that associates a first field with a plurality of code conversion rules;

generating second data that, for each conversion rule of said plurality of code conversion rules, associates the conversion rule with criteria for applying the conversion rule, wherein said criteria is based on one or more other fields other than said first field;

receiving a first code for the first field and zero or more codes for the one or more other fields;

inspecting said first data and said second data to determine which particular code conversion rule of said plurality of code conversion rules should be applied based on:
the zero or more codes, and
the criteria associated with each conversion rule of said plurality of code conversion rules; and converting said first code based on the particular code conversion rule that should be applied to convert said first code.

2. The method of claim 1, further including the steps of:

storing third data associates a second field with said plurality of code conversion rules;

receiving a second code for the second field and zero or more other codes for the one or more other fields; and converting said second code based on a particular code conversion rule of said plurality of code conversion rules that should be applied to convert said second code.

3. The method of claim 2, wherein:

the method further includes the step of establishing a plurality of code conversion categories associated with multiple code conversion rules, wherein said plurality of code conversion categories includes a particular code conversion category that is associated with said plurality of code conversion rules;

said first data associates said first field with said plurality of code conversion rules by associating said particular code conversion category with said first field; and said third data associates said second field with said plurality of code conversion rules by associating said particular code conversion category with said second field.

4. The method of claim 1, wherein the stop of converting said first code further includes converting said first code into a plurality of one or more other codes.

5. To method of claim 1, further including the step of receiving user input that specifies, for a particular conversion rule of said plurality of code conversion rules, the one or more other fields to associate with said criteria.

6. The method of claim 1, wherein the criteria associated with each conversion rule of said plurality of code conversion rules specifies a value for a field of said one or more other fields.

7. The method of claim 6, wherein the step of determining which particular code conversion rule should be applied further includes determining, for a given conversion rule of said plurality of code conversion rules, whether a particular value specified by the criteria associated with the given conversion rule matches a respective code from said zero or more codes.

8. The method of claim 6, wherein the step of determining which code conversion rule should be applied further includes determining which conversion rule of said plurality of code conversion rules specifies the greatest of number of values matched by a respective code from said zero or more other codes.

9. The method of claim 1, wherein each code conversion rule specifies an internal code and at least one external code.

10. The method of claim 9, wherein the step of converting said first code further includes converting said first code into a plurality of one or more other codes.

11. A method for converting codes between application the method comprising the steps of:

establishing a plurality of code conversion categories;

storing first data that associates each code conversion category of said plurality of code conversion categories with:
one or more conversion rules, and
a plurality of fields defined by an application;

wherein said plurality of code conversion categories includes a particular code conversion category that is associated with at least a first field and a second field;

receiving a first code associated with said first field;

inspecting said first data to determine that the first field has been associated with said particular code conversion category from said plurality of code conversion categories;

in response to determining that the first field has been associated with said particular code conversion category, then:

determining which particular code conversion rule associated with said particular code conversion category should be applied to the first code, and converting said first code into one or more external codes based on the particular code conversion rule that should be applied to the first code;

receiving a second code associated with said second field;

inspecting said first data to determine that the second field has been associated with the particular code conversion category; and in response to determining that the second field has been associated with the particular code conversion category, then:

determining which particular code conversion rule associated with said particular code conversion category should be applied to the second code, and converting said second code into another code based on the particular code conversion rule that should be applied to the second code.

12. A computer-readable medium carrying one or more sequences of instructions for converting code values between applications, wherein execution of the one or more sequences of instructions by one or more processors causes the one or more processor to perform the steps of:

generating first data that associates a first field with a plurality of code conversion rules;

generating second data that, for each conversion rule of said plurality of code conversion rules, associates the conversion rule with criteria for applying the conversion rule, wherein said criteria is based on one or more other fields other than said first field;

receiving a first code for the first field and zero or more codes for the one or more other fields;

inspecting said first data and said second data to determine which particular code conversion rule of said plurality of code conversion rules should be applied based on:

the zero or more codes, and the criteria associated with each conversion role of said plurality of code conversion rules; and converting said first code based on the particular code conversion rule that should be applied to convert said first code.

13. The computer-readable medium of claim 12, fiber including instructions for performing the steps of:

storing third data that associates a second field with said plurality of code conversion rules;

receiving a second code for the second field and zero or more other codes for the one or more other fields; and converting said second code based on a particular code conversion rule of said plurality of code conversion rules that should be applied to convert said second code.

14. The computer-readable medium of claim 13, wherein:

the computer-readable medium filer includes instructions for performing the step of establishing a plurality of code conversion categories associated with multiple code conversion rules, wherein said plurality of code conversion categories includes a particular code conversion category that is associated with said plurality of code conversion rules;

said first data associates said first field with said plurality of code conversion rules by associating said particular code conversion category with said first field; and said third data associates said second field with said plurality of code conversion rules by associating said particular code conversion category with said second field.

15. The computer-readable medium of claim 12, wherein the step of converting said first code further includes converting said first code into a plurality of one or more other codes.

16. The computer-readable medium of claim 12, further including instructions for performing the step of receiving user input that specifies, for a particular conversion rule of said plurality of code conversion rules, the one or more other fields to associate with said criteria.

17. The computer-readable medium of claim 12, wherein the criteria associated with each conversion rule of said plurality of code conversion rules specifies a value for a field of said one or more other fields.

18. The computer-readable medium of claim 17, wherein the step of determining which particular code conversion rule should be applied further includes determining, for a given conversion rule of said plurality of code conversion rules, whether a particular value specified by the criteria associated with the given conversion rule matches a respective code from said zero or more codes.

19. The computer-readable medium of claim 17, wherein the step of determining which code conversion rule should be applied further includes determining which conversion rule of said plurality of code conversion rules specifics the greatest of number of values matched by a respective code from said zero or more other codes.

20. The computer-readable medium of claim 12, wherein each code conversion rule specifies an internal code and at least one external code.

21. The computer-readable medium of claim 20, wherein the step of converting said first code further includes converting said first code into a plurality of one or more other codes.

22. A computer-readable medium carrying one or more sequences of instructions for converting code values between applications, wherein execution of the one or more sequences of instructions by one or more processors causes the one or more processors to perform the steps of:

establishing a plurality of code conversion categories;

storing first data that associates each code conversion category of said plurality of code conversion categories with:

one or more conversion rules, and a plurality of fields defined by an application;

wherein said plurality of code conversion categories includes a particular code conversion category that is associated with at least a first field and a second field;

receiving a first code associated with said first field;

inspecting said first data to determine that the first field has been associated with said particular code conversion category from said plurality of code conversion categories;

in response to determining that the first field has been associated with said particular code conversion category, then:

determining which particular code conversion rule associated with said particular code conversion category should be applied to the first code, and converting said first code into one or more external codes based on the particular code conversion rule that should be applied to the first code;

receiving a second code associated with said second field;

inspecting said first data to determine that the second field has been associated with the particular code conversion category; and in response to determining that the second field has been associated with the particular code conversion category, then:

determining which particular code conversion rule associated with said particular code conversion category should be applied to the second code, and converting said second code into another code based on the particular code conversion rule that should be applied to the second code.

23. A computer-implemented method for converting code values between applications, the method comprising:

associating a first field with a plurality of code conversion rules;

wherein each code conversion rule is associated with criteria for applying the conversion rule, wherein the criteria is based on one or more other fields other than the first field;

receiving a first code for the first field and zero or more codes for the one or more other fields; and convening the first code using a particular code conversion rule that is selected based on the particular code conversion's criteria.

24. The method of claim 23, further comprising:

determining which particular code conversion rule of said plurality of code conversion rules is selected based on:
the zero or more codes, and
the criteria associated with each conversion rule of said plurality of code conversion rules.

25. The method of claim 24, wherein the criteria associated with each conversion rule of said plurality of code conversion rules specifies a value for a field of said one or more other fields.

26. The method of claim 25, wherein the step of determining which particular code conversion rule should be applied further includes determining for a given conversion rule of said plurality of code conversion rules, whether a particular value specified by the criteria associated with the given conversion rule matches a respective code from said zero or more codes.

27. The method of claim 25, wherein the step of determining which code conversion rule should be applied further includes determining which conversion rule of said plurality of code conversion rules specifies the greatest of number of values matched by a respective code from said zero or more other codes.

28. The method of claim 23, further comprising:

associating a second field with said plurality of code conversion rules;

receiving a second code for the second field and zero or more other codes for the one or more other fields; and converting said second code based on a particular code conversion rule of said plurality of code conversion rules that should be applied to convert said second code.

29. The method of claim 28, wherein:

the method further includes the step of establishing a plurality of code conversion categories associated with multiple code conversion rules, wherein said plurality of code conversion categories includes a particular code conversion category that is associated with said plurality of code conversion rules;

associating said first field with said plurality of code conversion rules by associating said particular code conversion category with said first field; and associating said second field with said plurality of code conversion rules by associating said particular code conversion category with said second field.

30. The method of claim 23, wherein the stop of convex said first code further includes converting said first code into a plurality of one or more other codes.

31. The method of claim 23, further comprising:

receiving user input that specifies, for a particular conversion rule of said plurality of code conversion rules, the one or more other fields to associate with said criteria.

32. The method of claim 23, wherein each code conversion rule specifies an internal code and at least one external code.

33. A computer-readable medium carrying one or more sequences of instructions for converting code values between applications, wherein execution of the one or more sequences of instructions by one or more processors causes the one or more processors to perform the steps of:

associating a first field with one or more code conversion rules;

wherein each code conversion rule is associated with criteria for applying the conversion rule, wherein the criteria is based on one or more other fields other than the first field;

receiving a first code for the first field and zero or more codes for the one or more other fields; and converting the first code using a particular code conversion rule that is selected based on the particular code conversion's criteria.

34. The computer-readable medium of claim 33, further including instructions for performing the step of:

determining which particular code conversion rule of said plurality of code conversion rules is selected based on:
the zero or more codes, and
the criteria associated with each conversion rule of said plurality of code conversion rules.

35. The computer-readable medium of claim 34, wherein the criteria associated with each conversion rule of said plurality of code conversion rules specifies a value for a field of said one or more other fields.

36. The computer-readable medium of claim 35, wherein the step of determining which particular code conversion rule should be applied further includes determining for a given conversion rule of said plurality of code conversion rules, whether a particular value specified by the criteria associated with the given conversion rule matches a respective code from said zero or more codes.

37. The computer-readable medium of claim 35, wherein the step of determining which code conversion rule should be applied further includes determining which conversion rule of said plurality of code conversion rules specifies the greatest of number of values matched by a respective code from said zero or more other codes.

38. The computer-readable medium of claim 33, further including instructions for performing the steps of:

associating a second field with said plurality of code conversion rules;

receiving a second code for the second field and zero or more other codes for the one or more other fields, and converting said second code based on a particular code conversion rule of said plurality of code conversion rules that should be applied to convert said second code.

39. The compute-readable medium of claim 38, wherein:

the computer-readable medium further includes instructions for performing the step of establishing a plurality of code conversion categories associated with multiple code conversion rules, wherein said plurality of code conversion categories includes a particular code conversion category that is associated with said plurality of code conversion rules;

associating said first field with said plurality of code conversion rules by associating said particular code conversion category with said first field; and associating said second field with said plurality of code conversion rules by associating said particular code conversion category with said second field.

40. The computer-readable medium of claim 33, wherein the step of converting said first code further includes converting said first code into a plurality of one or more other codes.

41. The computer-readable medium of claim 33, further including instructions for performing the step of receiving user input that specifies, for a particular conversion rule of aid plurality of code conversion rules, the one or more other fields to associate with said criteria.

42. The computer-readable medium of claim 34, wherein each code conversion rule specifies an internal code and at least one external code.

* * * * *

UNITED STATES PATENT AND TRADEMARK OFFICE
CERTIFICATE OF CORRECTION

PATENT NO. : 6,820,266 B1
DATED : November 16, 2004
INVENTOR(S) : Garret Minakawa et al.

It is certified that error appears in the above-identified patent and that said Letters Patent is hereby corrected as shown below:

<u>Title page</u>,
Item [63], Related U.S. Application Data, delete "May 27" and insert -- February 27 --.

<u>Column 1</u>,
Line 7, delete "May 27" and insert -- February 27 --.

<u>Column 18</u>,
Line 19, delete "stop" and insert -- step --.
Line 48, delete "application" and insert -- applications, --.

<u>Column 19</u>,
Line 43, delete "fiber" and insert -- farther --.
Line 54, delete "filer" and insert -- further --.

<u>Column 21</u>,
Line 31, delete "determining" and insert -- determining, --.
Line 65, delete "stop of convex" and insert -- step of converting --.

<u>Column 22</u>,
Line 39, delete "determining" and insert -- determining, --.
Line 55, delete "fields," and insert -- fields; --.
Line 60, delete "compute-readable" and insert -- computer-readable --.

<u>Column 24</u>,
Line 4, delete "aid" and insert -- said --.

Signed and Sealed this

Fifth Day of April, 2005

JON W. DUDAS
*Director of the United States Patent and Trademark Office*